United States Patent
Li et al.

(10) Patent No.: US 12,160,567 B2
(45) Date of Patent: *Dec. 3, 2024

(54) AFFINE PREDICTION REFINEMENT WITH OPTICAL FLOW

(71) Applicant: Tencent America LLC, Palo Alto, CA (US)

(72) Inventors: Xiang Li, Saratoga, CA (US); Xiaozhong Xu, State College, PA (US); Guichun Li, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/962,328

(22) Filed: Oct. 7, 2022

(65) Prior Publication Data

US 2023/0044502 A1   Feb. 9, 2023

Related U.S. Application Data

(63) Continuation of application No. 16/854,578, filed on Apr. 21, 2020, now Pat. No. 11,523,109.

(Continued)

(51) Int. Cl.
*H04N 19/107* (2014.01)
*H04N 19/139* (2014.01)
(Continued)

(52) U.S. Cl.
CPC ......... *H04N 19/107* (2014.11); *H04N 19/139* (2014.11); *H04N 19/176* (2014.11); *H04N 19/196* (2014.11); *H04N 19/61* (2014.11)

(58) Field of Classification Search
CPC ... H04N 19/107; H04N 19/139; H04N 19/176
See application file for complete search history.

(56) References Cited

U.S. PATENT DOCUMENTS

| | | |
|---|---|---|
| 2006/0285596 A1 | 12/2006 | Kondo et al. |
| 2014/0126644 A1 | 5/2014 | Ström et al. |

(Continued)

FOREIGN PATENT DOCUMENTS

| | | |
|---|---|---|
| CN | 112272952 A | 1/2021 |
| CN | 113383551 A | 9/2021 |

(Continued)

OTHER PUBLICATIONS

Chinese Office Action issued in Application No. 202010354589.0, mailed Oct. 30, 2023, with English Translation, 23 pages.

(Continued)

*Primary Examiner* — Zhubing Ren
(74) *Attorney, Agent, or Firm* — ArentFox Schiff LLP

(57) ABSTRACT

A method of video decoding performed in a video decoder includes receiving a coded video bitstream including a current block that is divided into a plurality of sub-blocks. Sub-block based affine motion compensation is performed on the current block to generate a sub-block prediction for each pixel in each sub-block of the current block. One or more spatial gradients are determined for each sub-block prediction. For each sub-block prediction, prediction refinement with optical flow process is performed using the respective determined one or more spatial gradients and at least one constraint included in the coded video bitstream. For each sub-block prediction, an output of the respective prediction refinement is added to the respective sub-block prediction to generate a final prediction for each pixel in each sub-block of the current block.

20 Claims, 20 Drawing Sheets

Related U.S. Application Data

(60) Provisional application No. 62/842,321, filed on May 2, 2019.

(51) Int. Cl.
  *H04N 19/176* (2014.01)
  *H04N 19/196* (2014.01)
  *H04N 19/61* (2014.01)

(56) References Cited

U.S. PATENT DOCUMENTS

| | | |
|---|---|---|
| 2016/0035106 A1 | 2/2016 | Esaki |
| 2018/0270500 A1* | 9/2018 | Li .................... H04N 19/52 |
| 2018/0316929 A1 | 11/2018 | Li et al. |
| 2019/0045215 A1* | 2/2019 | Chen ................. H04N 19/577 |
| 2019/0124332 A1 | 4/2019 | Lim et al. |
| 2020/0221122 A1* | 7/2020 | Ye ..................... H04N 19/176 |
| 2020/0296405 A1* | 9/2020 | Huang ............... H04N 19/137 |
| 2020/0314443 A1 | 10/2020 | Huang et al. |
| 2022/0014776 A1 | 1/2022 | Sethuraman et al. |
| 2022/0210462 A1* | 6/2022 | Luo ................... H04N 19/176 |

FOREIGN PATENT DOCUMENTS

| | | | |
|---|---|---|---|
| CN | 113728646 A | 11/2021 | |
| CN | 113785586 A | 12/2021 | |
| JP | H1169345 A * | 3/1999 | ........... H04N 19/523 |

OTHER PUBLICATIONS

Xiang Li, et al., Non-CE4: On prediction refinement with optical flow, Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0553_r1, pp. 1-22.

* cited by examiner

12 # AFFINE PREDICTION REFINEMENT WITH OPTICAL FLOW

INCORPORATION BY REFERENCE

The present application is a continuation of U.S. application Ser. No. 16/854,578 filed on Apr. 21, 2020, which claims the benefit of priority to U.S. Provisional Application No. 62/842,321, "AFFINE PROF" filed on May 2, 2019. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

According to an exemplary embodiment, a method of video decoding performed in a video decoder includes receiving a coded video bitstream including a current block that is divided into a plurality of sub-blocks. The method includes performing sub-block based affine motion compensation on the current block to generate a sub-block prediction for each pixel in each sub-block of the current block. The method further includes determining one or more spatial gradients for each sub-block prediction. The method includes performing, for each sub-block prediction, prediction refinement with an optical flow process using the respective determined one or more spatial gradients and at least one constraint included in the coded video bitstream. The method further includes adding, for each sub-block prediction, an output of the respective prediction refinement to the respective sub-block prediction to generate a final prediction for each pixel in each sub-block of the current block.

According to an exemplary embodiment, a video decoder for video decoding, includes processing circuitry configured to receive a coded video bitstream including a current block that is divided into a plurality of sub-blocks. The processing circuitry is further configured to perform sub-block based affine motion compensation on the current block to generate a sub-block prediction for each pixel in each sub-block of the current block. The processing circuitry is further configured to determine one or more spatial gradients for each sub-block prediction. The processing circuitry is further configured to perform, for each sub-block prediction, prediction refinement with an optical flow process using the respective determined one or more spatial gradients and at least one constraint included in the coded video bitstream. The processing circuitry is further configured to add, for each sub-block prediction, an output of the respective prediction refinement to the respective sub-block prediction to generate a final prediction for each pixel in each sub-block of the current block.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 2:
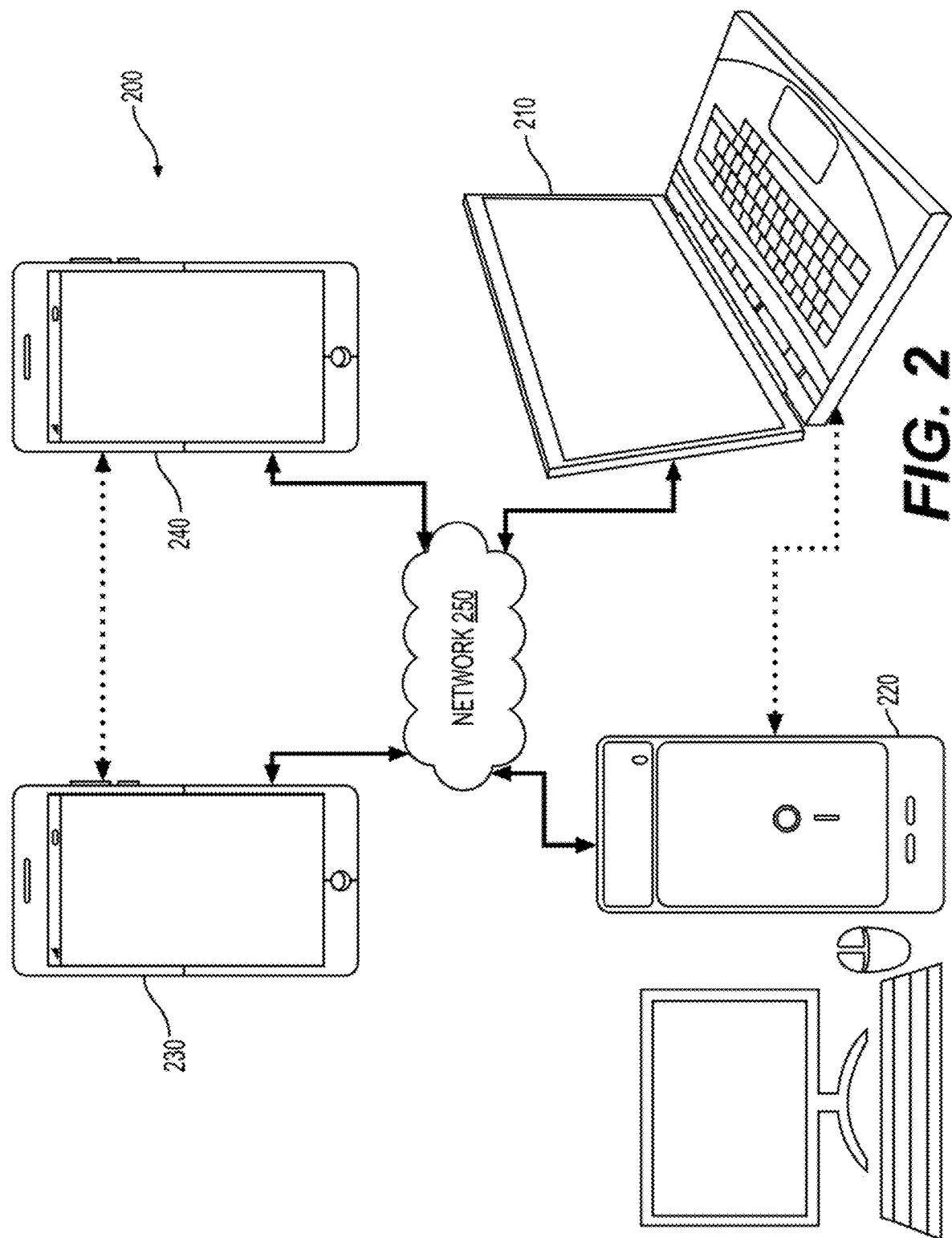
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
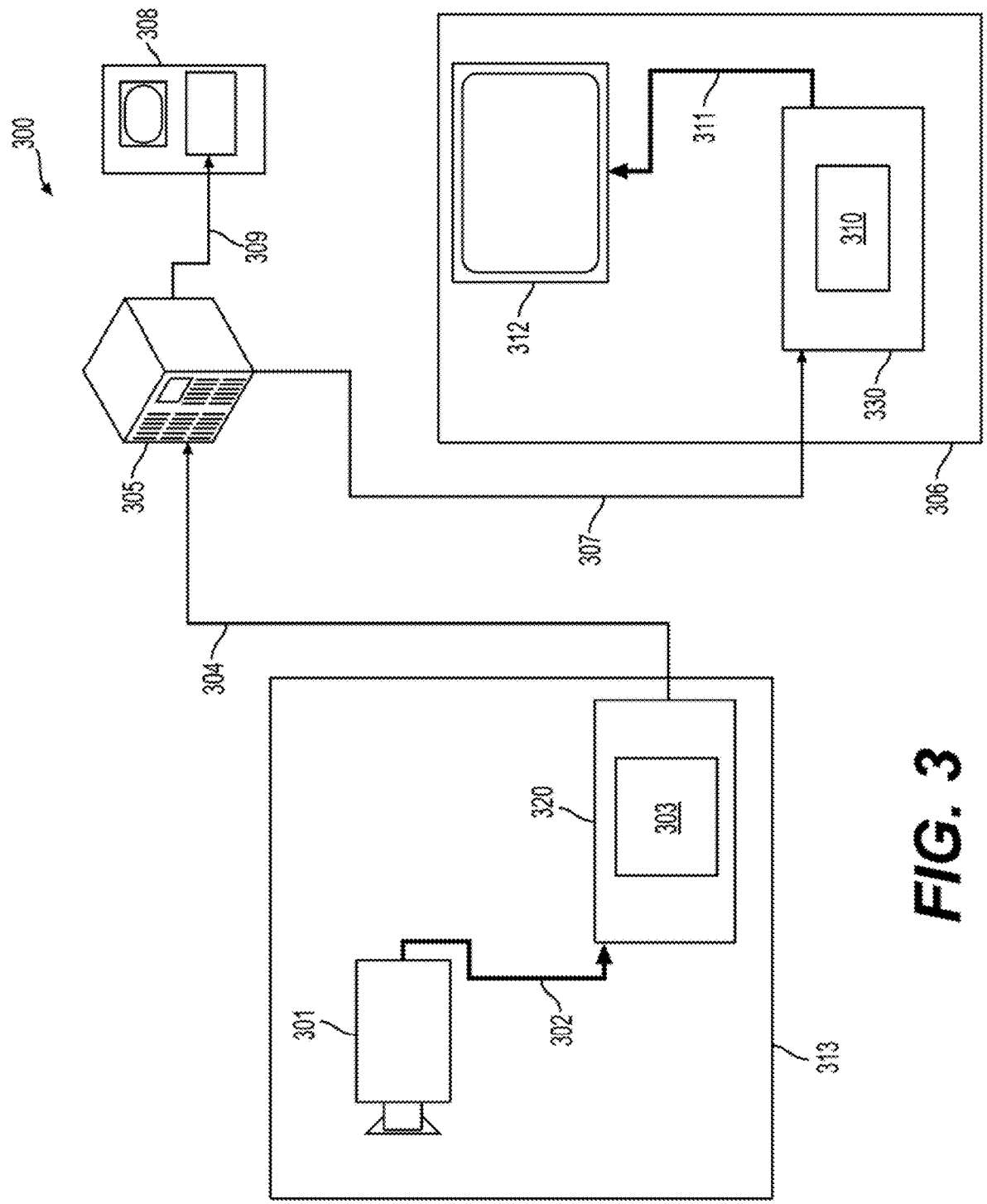
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
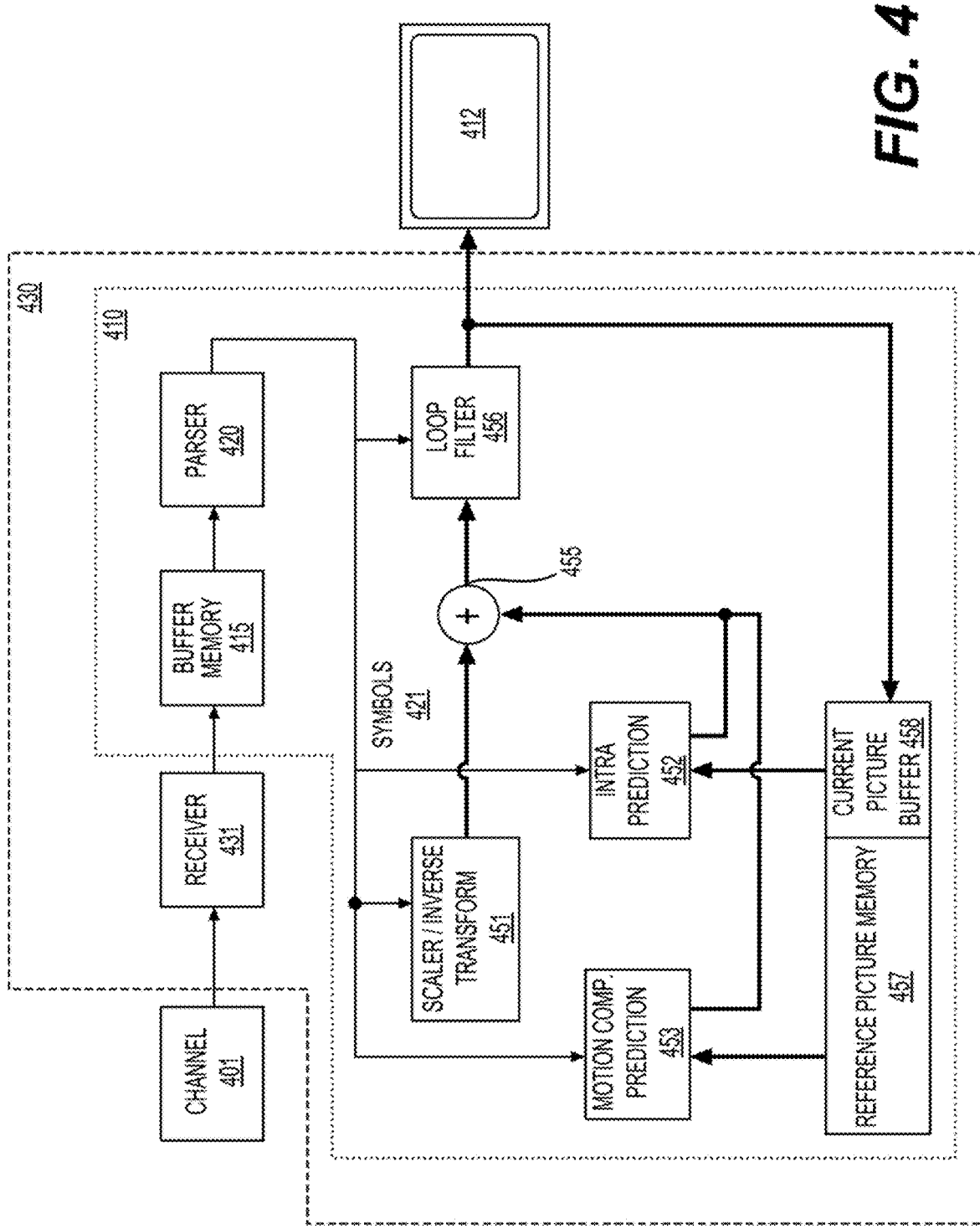
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
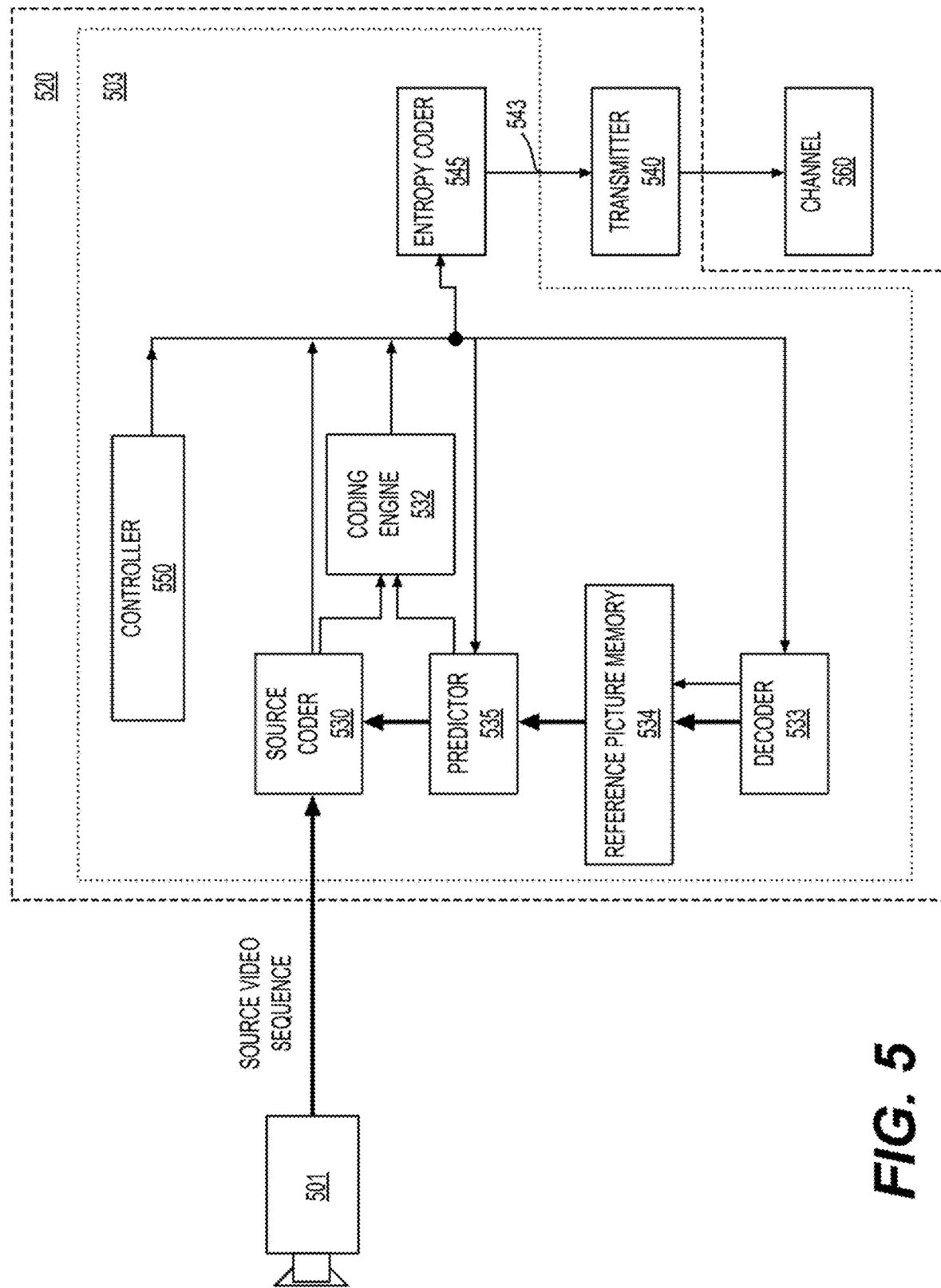
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
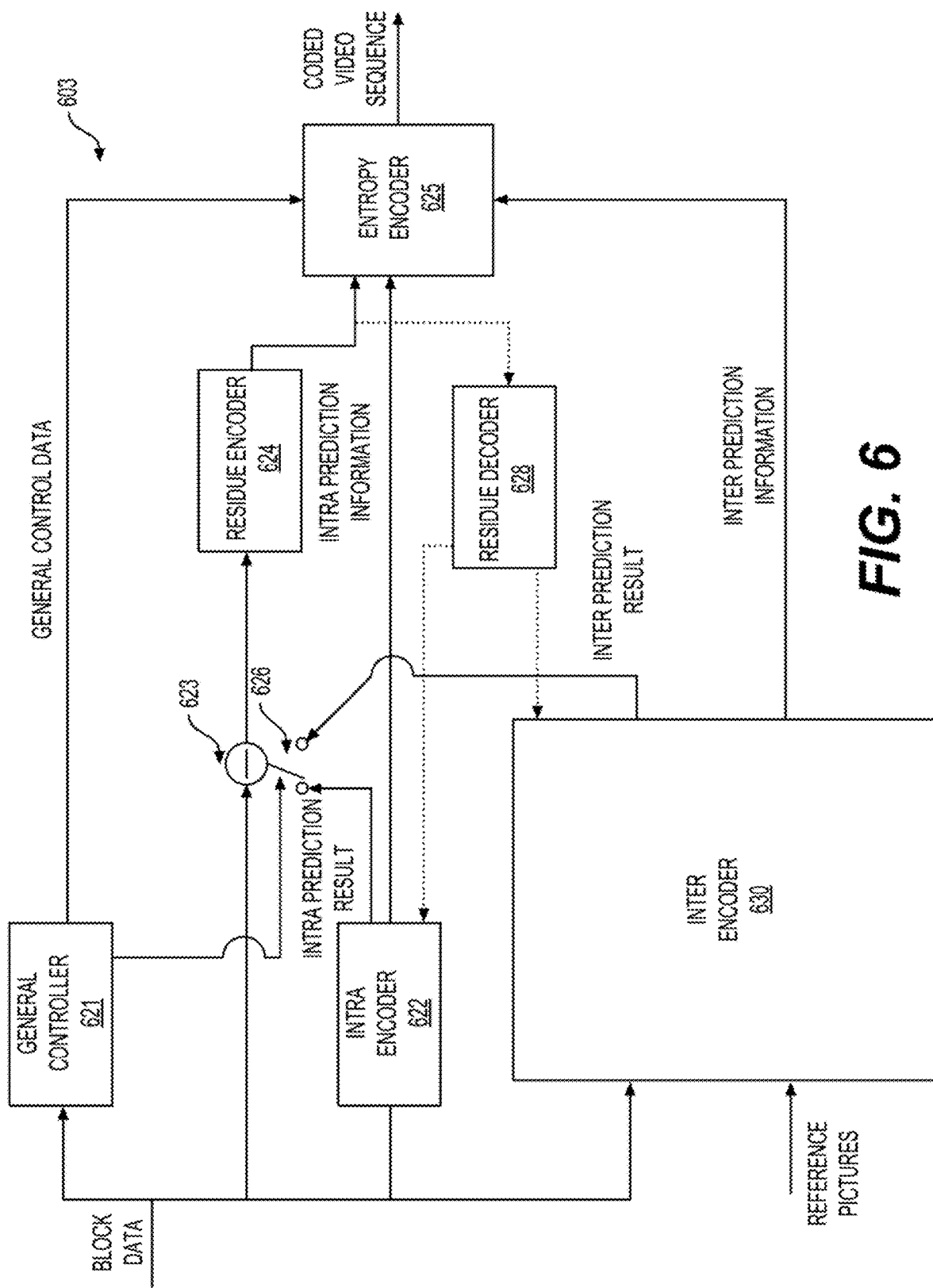
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
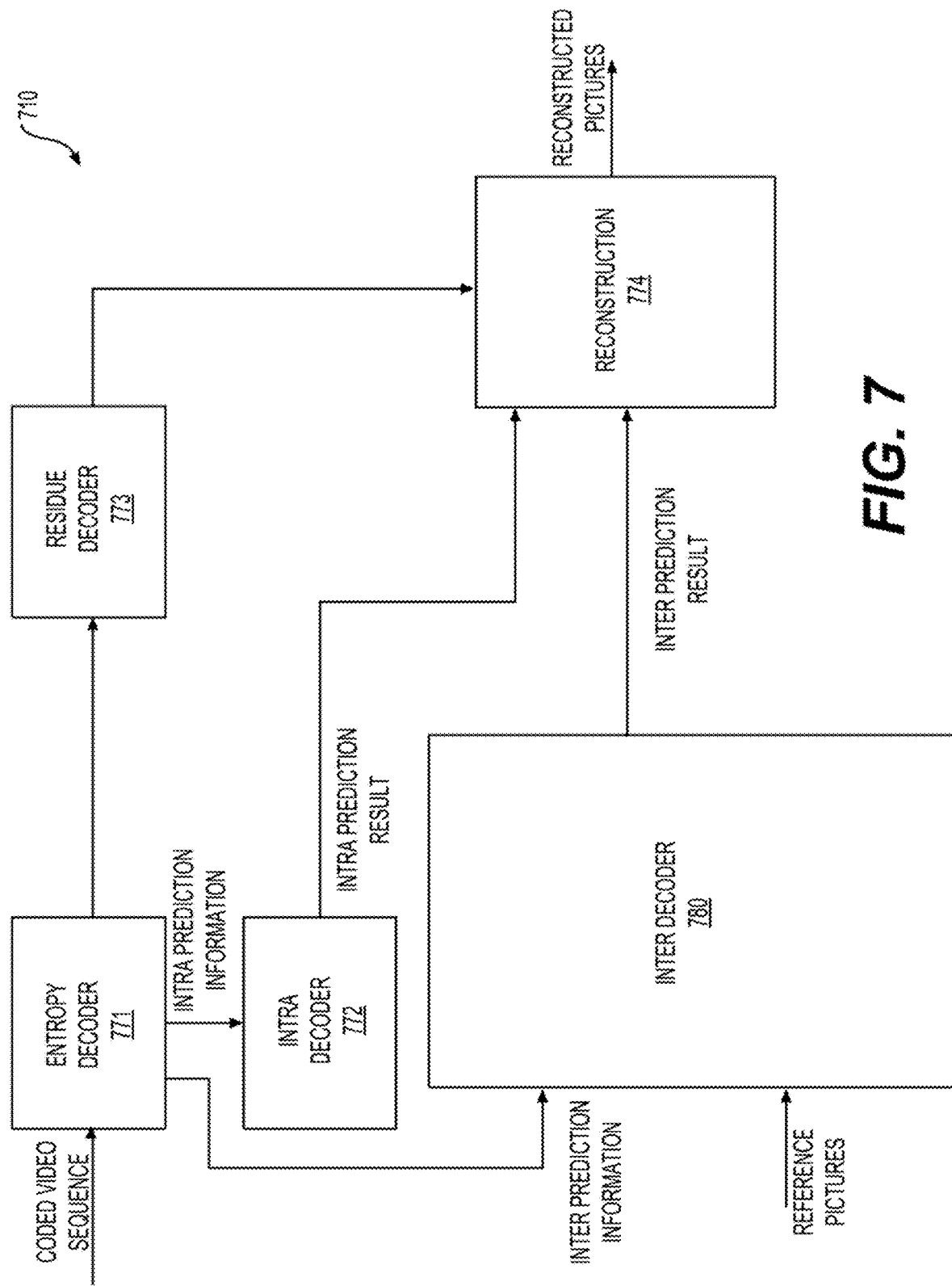
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide signaling techniques for non-merge inter modes in advanced video codec. To be more specific, the interpretation and signaling of implicitly derived motion vector predictors are modified so that better compression efficiency may be achieved.

Various coding standards, such as HEVC, VVC and the like are developed to include new techniques.

In some examples of VVC, for each inter-predicted CU, motion parameters include motion vectors, reference picture indices and reference picture list usage index, and additional information needed for the new coding feature of VVC to be used for inter-predicted sample generation. The motion parameters can be signaled in an explicit or implicit manner. In an example, when a CU is coded with skip mode, the CU is associated with one PU and has no significant residual coefficients, no coded motion vector delta or reference picture index. In another example, a merge mode is specified whereby the motion parameters for the current CU are obtained from neighboring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

Beyond the inter coding features in HEVC, the VVC test model 3 (VTM3) includes a number of new and refined inter prediction coding tools, such as extended merge prediction, merge mode with motion vector difference (MMVD), affine motion compensated prediction, sub-block based temporal motion vector predictor (SbTMVP), triangle partition prediction, combined inter and intra prediction (CIIP), and the like. Some features of the above mentioned inter prediction coding tools are described in the present disclosure.

In some examples, extended merge prediction is used in VTM4. Specifically, in VTM4, the merge candidate list is constructed by including the five types of candidates in an order of: (1) spatial motion vector predictor (MVP) from spatial neighbor CUs; (2) temporal MVP from collocated CUs; (3) history-based MVP from a FIFO table; (4) pairwise average MVP; and (5) zero MVs. In some embodiments, the techniques used in merge candidate list construction include spatial candidate derivation, temporal candidates derivation, history-based merge candidates derivation and pair-wise average merge candidates derivation.

In an example, the size of merge list is signaled in slice header and the maximum allowed size of a merge list is 6 in VTM4. For each CU coded in merge mode, an index of the best merge candidate is encoded using truncated unary binarization (TU). The first binary of the merge index is coded with context coding, and bypass coding can be used for other binaries.

Figure 1:
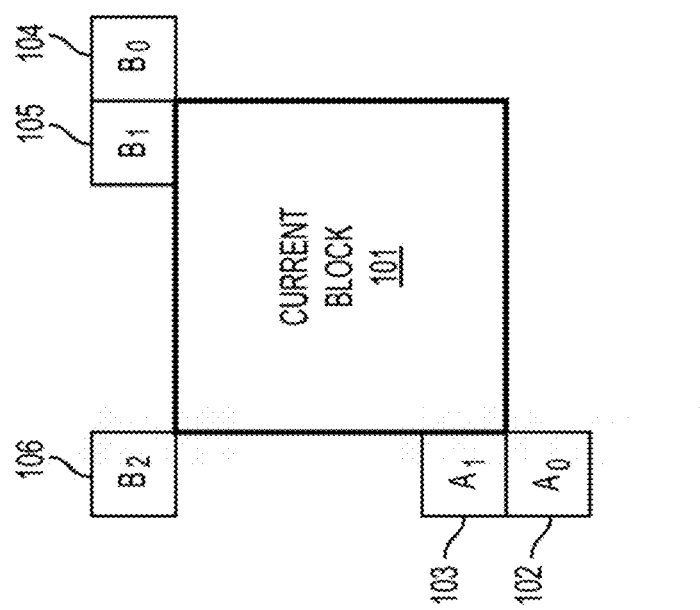
FIG. 1 is a schematic illustration of a current block and its surrounding spatial merge candidates in one example.
Figure 8:
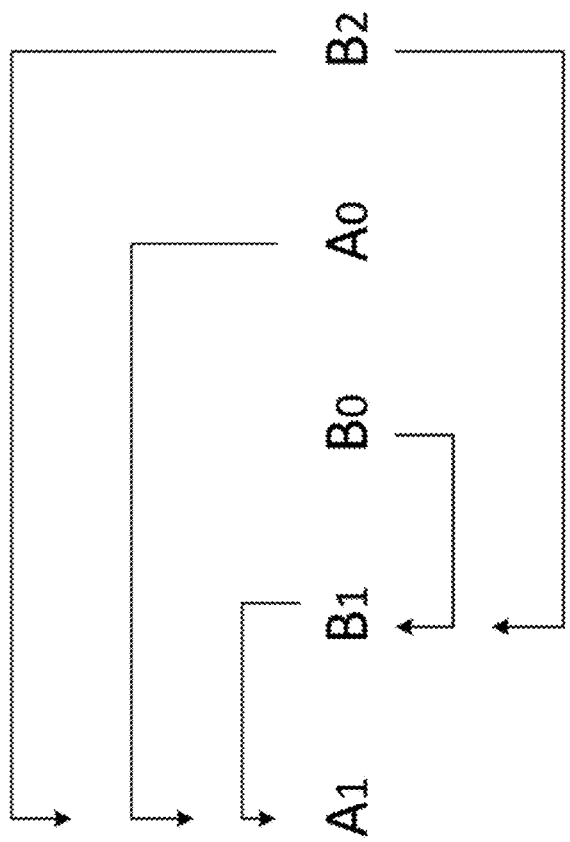
FIG. 8 shows a diagram illustrating redundancy check pairs for some embodiments.

For spatial candidate derivation, according to an aspect of the disclosure, the derivation of spatial merge candidates in VVC is similar to that in HEVC. For example, a maximum of four merge candidates are selected among candidates located in the positions A0-A1 and B0-B2 depicted in FIG. 1. The order of derivation is A1, B1, B0, A0 and B2. Position B2 is considered only when any CU of position A1, B1, B0, A0 is not available (e.g. belonging to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 8 are considered and a candidate is only added to the list if the corresponding candidate used for redundancy check has not the same motion information.

For temporal candidate derivation, according to an aspect of the disclosure, only one candidate is added to the list. Particularly, in the derivation of the temporal merge candidate, a scaled motion vector is derived based on a co-located CU belonging to the collocated reference picture. The reference picture list to be used for derivation of the co-located CU is explicitly signaled in the slice header.

Figure 9:
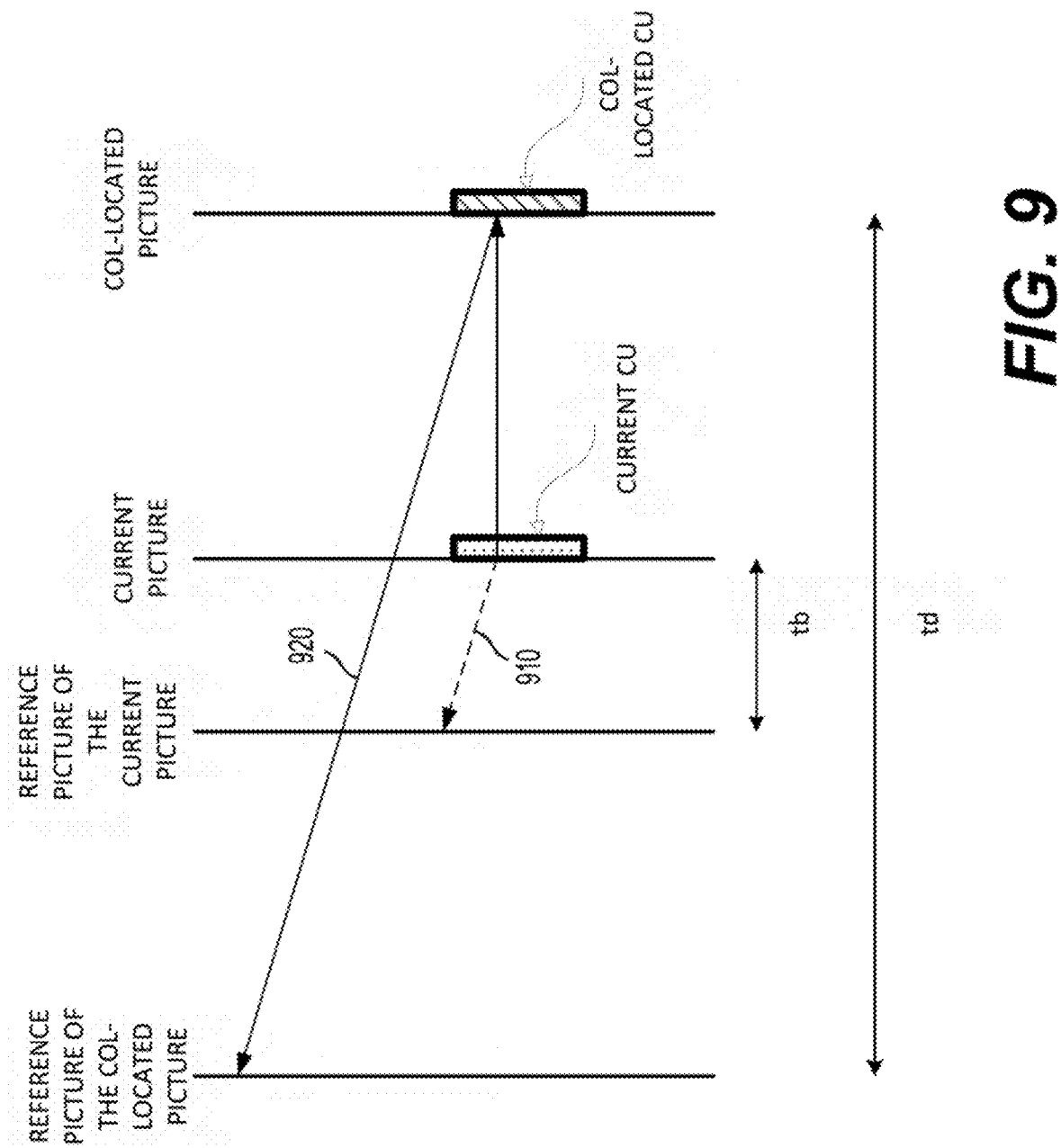
FIG. 9 shows an example for temporal candidate derivation.

FIG. 9 shows an example for temporal candidate derivation. FIG. 9 shows a sequence of pictures that includes a current picture having a current CU, a collocated picture having a col-located CU of the current CU, a reference picture of the current picture and a reference picture of the col-located picture. In an example, a picture order count (POC) distance (e.g., difference of POCs) between the reference picture of the current picture and the current picture is denoted as tb, and the POC distance between the reference picture of the col-located picture and the col-located picture is denoted as td. The scaled motion vector for temporal merge candidate is shown by 910 in FIG. 9, which is scaled from the motion vector 920 of the co-located CU using the POC distances, tb and td. The reference picture index of temporal merge candidate is set equal to zero.

Figure 10:
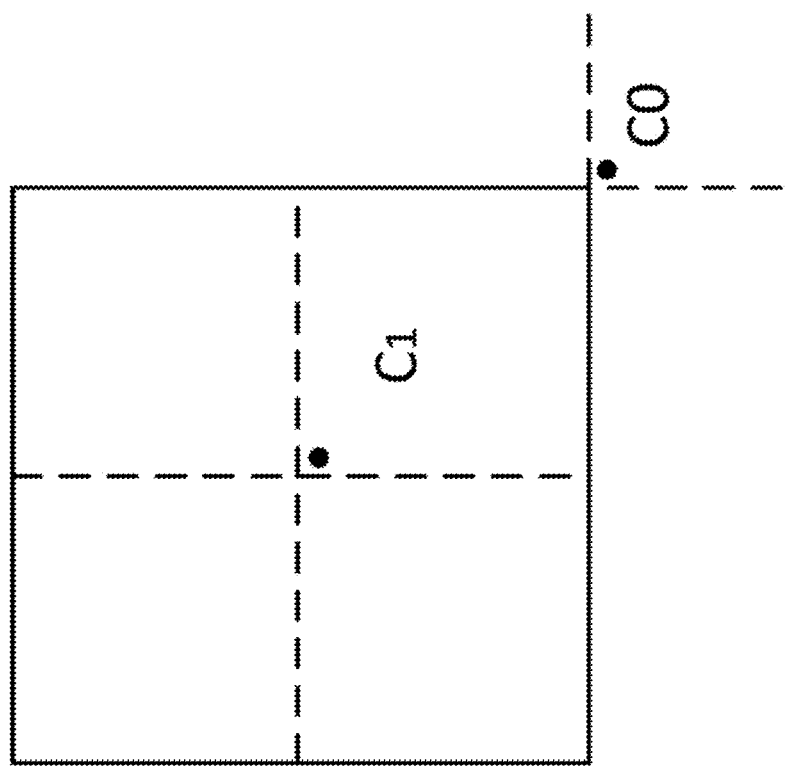
FIG. 10 shows an example for illustrating the position for the temporal candidate.

FIG. 10 shows an example for illustrating the position for the temporal candidate that is selected between candidates $C_0$ and $C_1$. When the CU at position $C_0$ is not available, or is intra coded, or is outside of the current row of CTUs, then the position $C_1$ can be used. Otherwise, the position $C_0$ is used in the derivation of the temporal merge candidate.

For affine motion compensated prediction, in HEVC, only translation motion model is applied for motion compensation prediction (MCP). The real world has many kinds of motion, e.g. zoom in/out, rotation, perspective motions and the other irregular motions. In the VTM3, a block-based affine transform motion compensation prediction is applied.

Figure 11B:
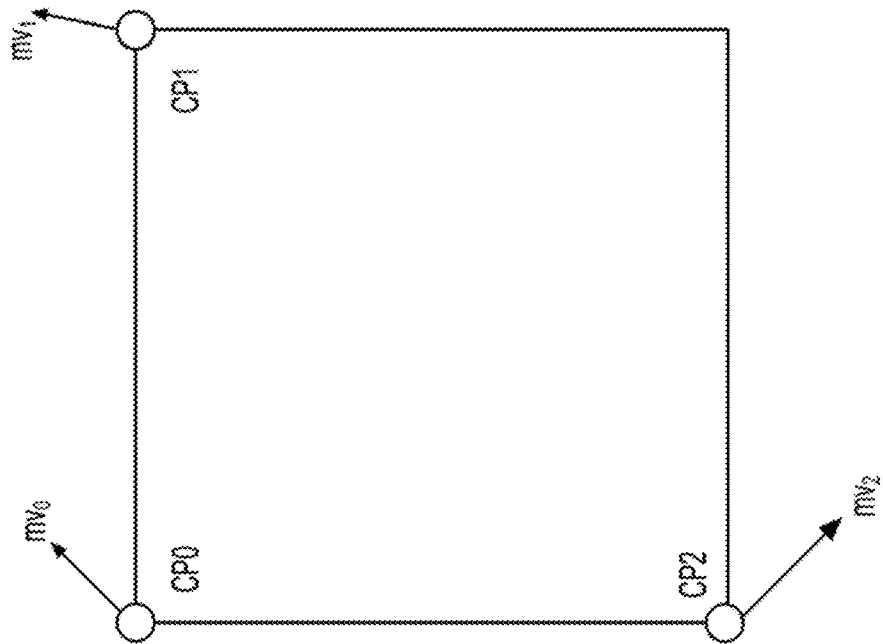
FIGS. 11A-11B show the affine motion field of a block described by motion information of control points.
Figure 11A:
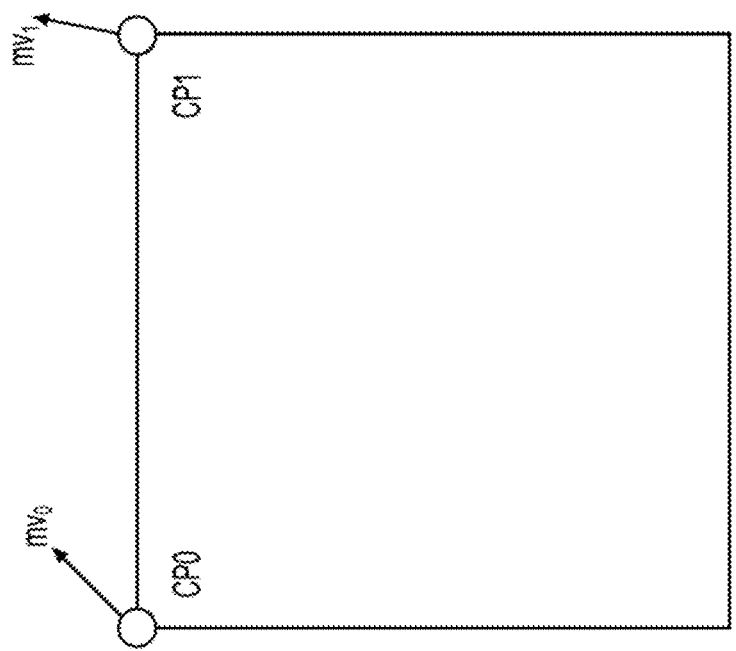

FIG. 11A shows the affine motion field of the block that is described by motion information of two control points (4-parameter affine model) and FIG. 11B shows the affine motion field of a block that is described by three control points (6-parameter affine model).

In some embodiments, the 4-parameter affine motion model, motion vector at sample location (x, y) in a block can be derived as Eq. 1, and the 6-parameter affine motion model, motion vector at sample location (x, y) in a block can be derived as Eq. 2:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} + mv_{0x}}{W}y + mv_{0y} \end{cases} \quad \text{(Eq. 1)}$$

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} + mv_{0y}}{H}y + mv_{0y} \end{cases} \quad \text{(Eq. 2)}$$

where $(mv_{0x}, mv_{0y})$ denotes the motion vector of the top-left corner control point CP0, $(mv_{1x}, mv_{1y})$ is motion vector of the top-right corner control point CP1, and $(mv_{2x}, mv_{2y})$ is motion vector of the bottom-left corner control point CP2.

In order to simplify the motion compensation prediction, block based affine transform prediction is applied.

Figure 12:
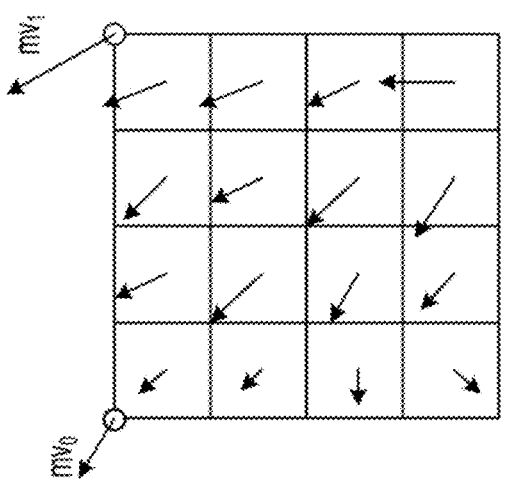
FIG. 12 shows an example of affine motion vector field per sub-block.

FIG. 12 shows an example of affine MV field per sub-block. The current CU is divided into 4×4 luma sub-blocks. To derive motion vector of each 4×4 luma sub-block, the motion vector of the center sample of each sub-block, as shown in FIG. 12, is calculated according to above equations, and rounded to $\frac{1}{16}$ fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks in an example.

Two affine motion inter prediction modes, such as affine merge (AF_MERGE) mode and affine advanced MVP (AMVP) mode, can be used.

For affine merge prediction, in an example, AF_MERGE mode can be applied for CUs with both width and height larger than or equal to 8. In the AF_MERGE mode, the control point motion vectors (CPMVs) of the current CU are generated based on the motion information of the spatial neighboring CUs. In an example, there can be up to five CPMVP candidates and an index is signalled to indicate the one to be used for the current CU. In an example, three types of CPVM candidates are used to form the affine merge candidate list. The first type of CPMV candidates is inherited affine merge candidates that extrapolated from the CPMVs of the neighbour CUs. The second type of CPMV candidates are constructed affine merge candidates CPMVPs that are derived using the translational MVs of the neighbour CUs. The third type of CPMV candidates is Zero MVs.

In some examples, such as in VTM3, a maximum of two inherited affine candidates can be used. In an example, two inherited affine candidates are derived from affine motion models of the neighboring blocks, one from left neighboring CUs (referred to as left predictor) and one from above neighboring CUs (referred to as above predictor). In some examples, for the left predictor, the scan order is A0->A1, and for the above predictor, the scan order is B0->B1->B2. In an example, only the first inherited candidate from each side is selected. In some examples, no pruning check is performed between two inherited candidates. When a neighboring affine CU is identified, the control point motion vectors of the neighboring affine CU are used to derive the CPMVP candidate in the affine merge list of the current CU.

Figure 13:
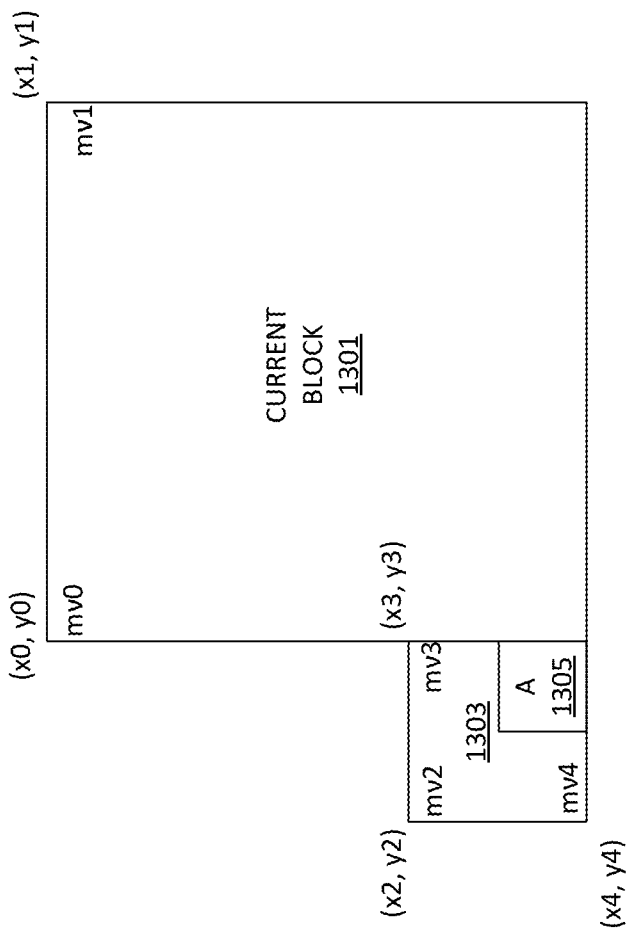
FIG. 13 shows an example for affine merge mode.

FIG. 13 shows an example for affine merge mode. As shown in FIG. 13, when the neighbour left bottom block A (1305) is coded in affine mode, the motion vectors $mv_2$, $mv_3$ and $mv_4$ of the top left corner, above right corner and left bottom corner of a CU (1303) which contains the block A (1305) are attained. When block A (1305) is coded with 4-parameter affine model, the two CPMVs of the current CU (1301) are calculated according to $mv_2$, and $mv_3$. In case that block A (1305) is coded with 6-parameter affine model, the three CPMVs of the current CU (1301) are calculated according to $mv_2$, $mv_3$ and $mv_4$.

In some examples, a constructed affine candidate is constructed by combining the neighbor translational motion information of each control point. The motion information for the control points can be derived from the specified spatial neighbors and temporal neighbor.

Figure 14:
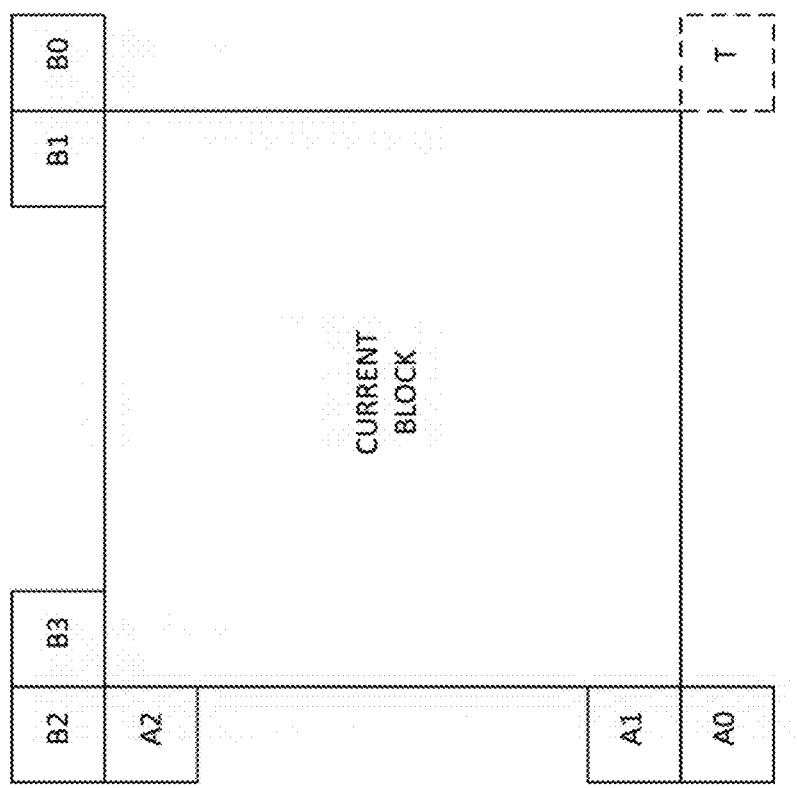
FIG. 14 shows an example of spatial neighbors and temporal neighbor according to some embodiments of the disclosure.

FIG. 14 shows an example of spatial neighbors (e.g., A0-A2 and B0-B3) and temporal neighbor (e.g., T) according to some embodiments of the disclosure. In an example, CPMVk (k=1, 2, 3, 4) represents the k-th control point. For CPMV$_1$, the B2->B3->A2 blocks are checked (-> is used for checking order) and the MV of the first available block is used. For CPMV$_2$, the B1->B0 blocks are checked and for CPMV$_3$, the A1->A0 blocks are checked. For TMVP, T is checked and is used as CPMV$_4$ if the MV of the block T is available.

After MVs of four control points are attained, affine merge candidates are constructed based on that motion information. The following combinations of control point MVs are used to construct in order: {CPMV$_1$, CPMV$_2$, CPMV$_3$}, {CPMV$_1$, CPMV$_2$, CPMV$_4$}, {CPMV$_1$, CPMV$_3$, CPMV$_4$},{CPMV$_2$, CPMV$_3$, CPMV$_4$}, {CPMV$_1$, CPMV$_2$}, {CPMV$_1$, CPMV$_3$}.

The combination of 3 CPMVs can construct a 6-parameter affine merge candidate and the combination of 2 CPMVs can construct a 4-parameter affine merge candidate. In an example, to avoid motion scaling process, when the reference indices of control points are different, the related combination of control point MVs can be discarded.

In an example, after inherited affine merge candidates and constructed affine merge candidate are checked, if a candidate list is still not full, zero MVs are inserted to the end of the list.

For affine AMVP prediction, the affine AMVP mode can be applied on CUs with both width and height larger than or equal to 16. In some examples, an affine flag at CU level is signalled in the bitstream (e.g., coded video bitstream) to indicate whether affine AMVP mode is used in the CU and then another flag is signaled to indicate whether 4-parameter affine or 6-parameter affine is used. In the affine AMVP mode, the difference of the CPMVs of current CU and their predictors CPMVPs is signalled in the bitstream. The affine AMVP candidate list size is 2 and the affine AMVP candidate list is generated by using the following four types of CPVM candidate in the order: (1) inherited affine AMVP candidates that extrapolated from the CPMVs of the neighbour CUs; (2) constructed affine AMVP candidates CPMVPs that are derived using the translational MVs of the neighbour CUs; (3) translational MVs from neighboring CUs; and (4) Zero MVs.

In some examples, the checking order of inherited affine AMVP candidates is the same as the checking order of inherited affine merge candidates. In an example, the only difference between the affine merge prediction and affine AMVP prediction is that, for AVMP candidate, only the affine CU that has the same reference picture as the current block is considered. In an example, no pruning process is applied when inserting an inherited affine motion predictor into the candidate list.

In some examples, constructed AMVP candidate can be derived from the specified spatial neighbors shown in FIG. 14. In an example, the same checking order is used as done in the candidate construction for the affine merge prediction. In addition, reference picture index of the neighboring block is also checked. The first block in the checking order that is inter coded and has the same reference picture as in current CUs is used. When the current CU is coded with 4-parameter affine mode, and motion vectors of two control points $mv_0$ and $mv_1$ are both available, the motion vectors of the two control points are added as one candidate in the affine AMVP list. When the current CU is coded with 6-parameter affine mode, and all three motion vectors of the control points CPMVs are available, they are added as one candidate in the affine AMVP list. Otherwise, constructed AMVP candidate is set as unavailable.

When the number of affine AMVP list candidates is still less than 2 after inherited affine AMVP candidates and constructed AMVP candidate are checked, $mv_0$, $mv_1$ and $mv_2$ will be added, in order, as the translational MVs to predict all control point MVs of the current CU, when available. Finally, zero MVs are used to fill the affine AMVP list if the affine AMVP list is still not full.

In some examples, the sub-block based temporal motion vector prediction (SbTMVP) can be used in VTM. Similar to the temporal motion vector prediction (TMVP) in HEVC, SbTMVP uses the motion field in the collocated picture to improve motion vector prediction and merge mode for CUs in the current picture. In some examples, the same collocated picture used by TMVP is used for SbTVMP. SbTMVP differs from TMVP in two aspects. In the first aspect, TMVP predicts motion at CU level but SbTMVP predicts motion at sub-CU level. In the second aspect, TMVP fetches the temporal motion vectors from the collocated block in the collocated picture (the collocated block is the bottom-right or center block relative to the current CU), SbTMVP applies a motion shift before fetching the temporal motion information from the collocated picture. The motion shift is obtained from the motion vector from one of the spatial neighboring blocks of the current CU.

Figure 15:
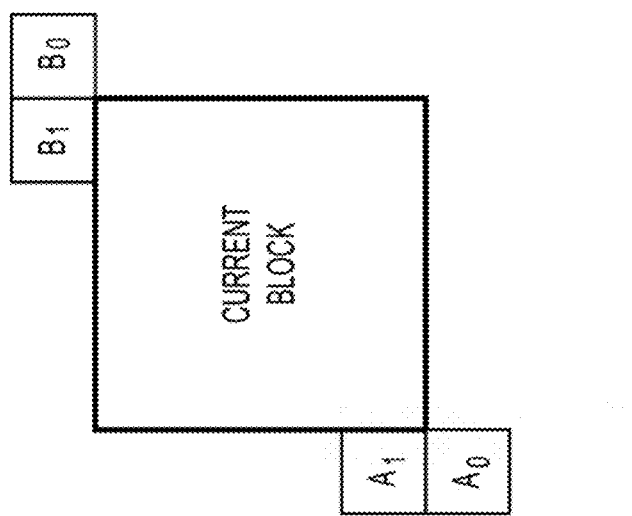
FIG. 15 shows an example of spatial neighbors according to some embodiments of the disclosure.
Figure 16:
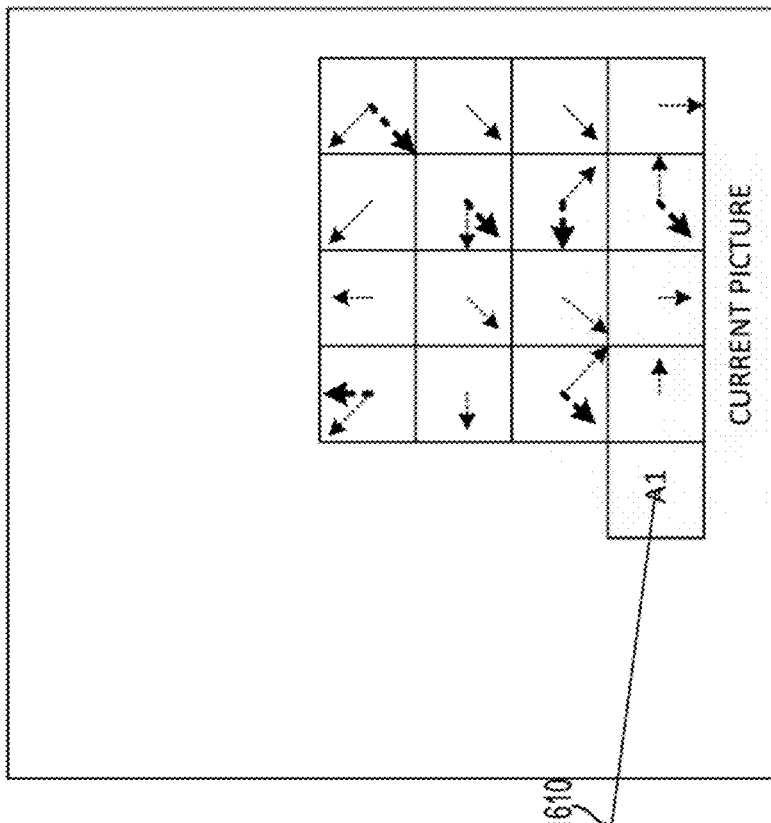
FIG. 16 shows an example of a SbTVMP process according to some embodiments of the disclosure.
Figure 16:
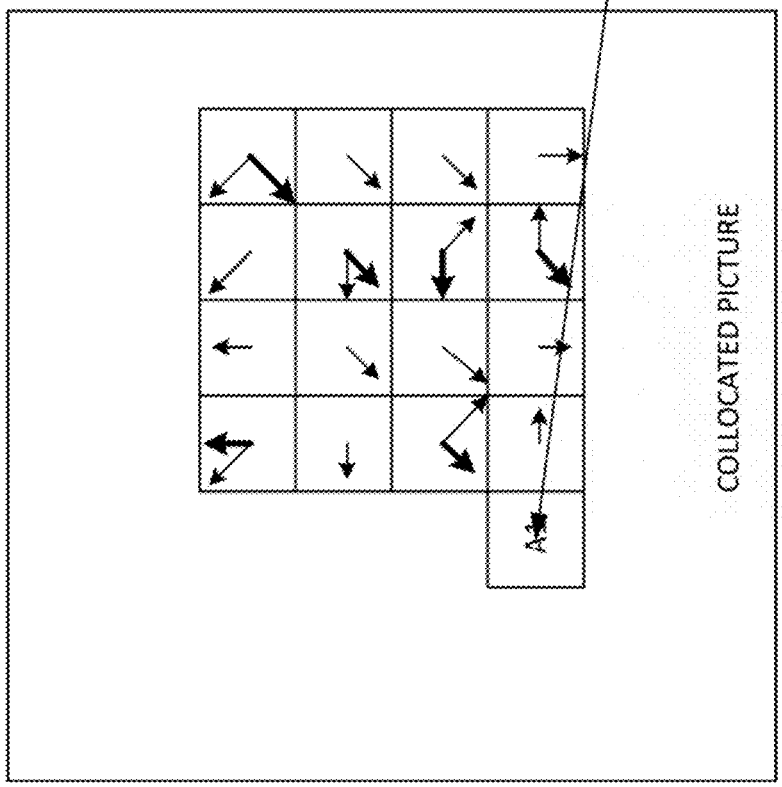

FIGS. 15-16 show an example of a SbTVMP process according to some embodiments of the disclosure. SbTMVP predicts the motion vectors of the sub-CUs within the current CU in two steps. In the first step, the spatial neighbors shown in FIG. 15 are examined in the order of A1, B1, B0 and A0 to identify a first spatial neighboring block that has a motion vector using the collocated picture as its reference picture. Then, the motion vector using the collected picture as its reference picture is selected to be the motion shift to be applied. If no such motion is identified from the spatial neighbors of A1, B1, B0 and A0, then the motion shift is set to (0, 0).

In the second step, the motion shift identified in the first step is applied (i.e. added to the current block's coordinates) to obtain sub-CU-level motion information (motion vectors and reference indices) from the collocated picture as shown in FIG. 16. In the FIG. 16 example, A1's motion vector is set as the motion shift (1610). Then, for each sub-CU, the motion information of the corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC. For example, temporal motion scaling is applied to align the reference pictures of the temporal motion vectors to those of the current CU.

In some examples, such as in VTM3, a combined sub-block based merge list which includes both SbTVMP candidate and affine merge candidates is used for the signalling of sub-block based merge mode. The SbTVMP mode is enabled/disabled by a sequence parameter set (SPS) flag. When the SbTMVP mode is enabled, the SbTMVP predictor is added as the first entry of the combined sub-block based merge list, and followed by the affine merge candidates. The maximum allowed size of the sub-block based merge list is 5 in VTM3.

In an example, the sub-CU size used in SbTMVP is fixed to be 8×8, and as done for affine merge mode, SbTMVP mode is only applicable to the CU with both width and height are larger than or equal to 8.

In some embodiments, the encoding logic of the additional SbTMVP merge candidate is the same as for the other merge candidates. In an example, for each CU in P or B slice, an additional rate distortion check is performed to decide whether to use the SbTMVP candidate.

According to some embodiments, affine motion model parameters can be used to derive the motion vector of each pixel in a CU. However, due to the high complexity and memory access bandwidth for generating pixel-based affine motion compensated prediction, the current VVC adopted a sub-block based affine motion compensation method, where a CU is divided into 4×4 sub-blocks, each of which is assigned with a MV derived from the affine CU's control point MVs. The sub-block based affine motion compensation is a trade-off between coding efficiency, complexity, and memory access bandwidth. Sub-block based affine motion compensation loses some prediction accuracy due to sub-block based prediction, where all pixels in the sub-block share the same motion.

To achieve a finer granularity of motion compensation, in some embodiments, a method to refine the sub-block based affine motion compensated prediction with optical flow (PROF) is used. After the sub-block based affine motion compensation is performed, the luma prediction samples may be refined by adding a difference derived by the optical flow equation. This method is referred to a prediction refinement with optical flow (PROF), which includes the following four steps in some embodiments.

Step 1: The sub-block based affine motion compensation is performed to generate sub-block prediction I(i,j) for each pixel at position (i,j) in each sub-block in the current block.

Step 2: The spatial gradients $g_x(i,j)$ and $g_y(i,j)$ for each pixel at position (i,j) for each sub-block prediction I(i,j) are calculated at each sample location using a 3-tap filter [−1, 0, 1].

$$g_x(i,j)=I(i+1,j)-I(i-1,j) \qquad \text{(Eq. 3)}$$

$$g_y(i,j)=I(i,j+1)-I(i,j-1) \qquad \text{(Eq. 4)}$$

The sub-block prediction for each sub-block may be extended by one pixel on each side for the gradient calculation. To reduce the memory bandwidth and complexity, a padding process may be applied (i.e., the pixels on the extended borders are copied from the nearest integer pixel position in the reference picture). Therefore, additional interpolation for the padded region is avoided.

Figure 17:
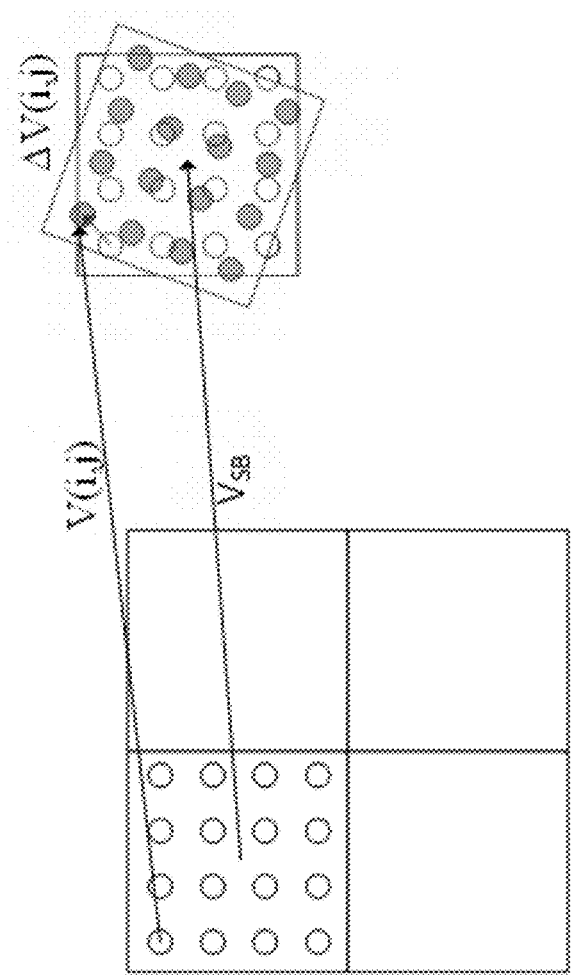
FIG. 17 shows an example of a sub-block MV ($V_{SB}$) and pixel motion vector ($\Delta v(i,j)$).

Step 3: The luma prediction refinement is calculated for each sub-block by the optical flow equation as follows.

$$\Delta I(i,j)=g_x(i,j)*\Delta v_x(i,j)+g_y(i,j)*\Delta v_y(i,j) \qquad \text{(Eq. 5)}$$

where the $\Delta v(i,j)$ is the difference between pixel MV computed for sample location (i,j), denoted by v(i,j), and the sub-block MV of the sub-block to which pixel (i,j) belongs, as shown in FIG. 17.

Since the affine model parameters and the pixel location relative to the sub-block center are not changed from sub-block to sub-block, $\Delta v(i,j)$ can be calculated for the first sub-block, and reused for other sub-blocks in the same CU. Let x and y be the horizontal and vertical offset from the pixel location to the center of the sub-block, $\Delta v(x, y)$ can be derived by the following equation:

$$\begin{cases} \Delta v_x(x, y) = a*x + b*y \\ \Delta v_y(x, y) = c*x + d*y \end{cases} \qquad \text{(Eq. 6)}$$

The 4-parameter affine model can be derived as follows:

$$\begin{cases} a = d = \dfrac{v_{1x} - v_{0x}}{w} \\ c = -b = \dfrac{v_{1y} - v_{0y}}{w} \end{cases} \qquad \text{(Eq. 7)}$$

The 6-parameter affine model can be derived as follows:

$$\begin{cases} a = \dfrac{v_{1x} - v_{0x}}{w} \\ b = \dfrac{v_{2x} - v_{0x}}{h} \\ c = \dfrac{v_{1y} - v_{0y}}{w} \\ d = \dfrac{v_{2y} - v_{0y}}{h} \end{cases} \quad \text{(Eq. 8)}$$

where $(v_{0x},v_{0y})$, $(v_{1x},v_{1y})$, $(v_{2x},v_{2y})$ are the top-left, top-right and bottom-left control point motion vectors, w and h are the width and height of the CU.

Step 4: The luma prediction refinement for each pixel at position (i,j) in each sub-block is added to the respective sub-block prediction I(i,j). The final prediction I' for each pixel in each sub-block may be generated according to the following equation.

$$I'(i,j)=I(i,j)+\Delta I(i,j) \quad \text{(Eq. 9)}$$

A bi-directional optical flow (BDOF) tool is included in VTM4. BDOF, previously referred to as BIO, was included in the JEM. Compared to the JEM version, the BDOF in VTM4 is a simpler version that requires much less computation, especially in terms of a number of multiplications that need to be performed and a size of a multiplier. According to some embodiments, BDOF is used to refine the bi-prediction signal of a CU at the 4×4 sub-block level. BDOF may be applied to a CU if the CU satisfies the following conditions: 1) the CU's height is not 4, and the CU is not in size of 4×8; 2) the CU is not coded using affine mode or the ATMVP merge mode; and 3) the CU is coded using "true" bi-prediction mode (i.e., one of the two reference pictures is prior to the current picture in display order and the other is after the current picture in display order). In some embodiments, BDOF is only applied to the luma component.

The BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement may then be used to adjust the bi-predicted sample values in the 4×4 sub-block. In some embodiments, the following steps are applied in the BDOF process.

Step 1: The horizontal and vertical gradients, $$\frac{\partial I^{(k)}}{\partial x}(i, j) \text{ and } \frac{\partial I^{(k)}}{\partial y}(i, j),$$

k=0,1, of the two prediction signals are computed by directly calculating the difference between two neighboring samples based on the following equations.

$$\frac{\partial I^{(k)}}{\partial x}(i, j) = \left(I^{(k)}(i+1, j) - I^{(k)}(i-1, j)\right) \gg shift1 \quad \text{(Eq. 10)}$$

$$\frac{\partial I^{(k)}}{\partial y}(i, j) = \left(I^{(k)}(i, j+1) - I^{(k)}(i, j-1)\right) \gg shift1$$

where $I^{(k)}(i,j)$ are the sample value at coordinate (i,j) of the prediction signal in list k, k=0,1, and shift1 is calculated based on the luma bit depth, bitDepth, as shift1=max(2, 14−bitDepth).

Step 2: The auto- and cross-correlation of the gradients, $S_1$, $S_2$, $S_3$, $S_5$ and $S_6$, are calculated as follows:

$$S_1 = \Sigma_{(i,j) \in \Omega} \psi_x(i,j) \cdot \psi_x(i,j), S_3 = \Sigma_{(i,j) \in \Omega} \theta(i,j) \cdot \psi_x(i,j)$$

$$S_2 = \Sigma_{(i,j) \in \Omega} \psi_x(i,j) \cdot \psi_y(i,j)$$

$$S_5 = \Sigma_{(i,j) \in \Omega} \Psi_y(i,j) \cdot \psi_y(i,j) S_6 = \Sigma_{(i,j) \in \Omega} \theta(i,j) \cdot \psi_y(i,j) \quad \text{(Eq. 11)}$$

where $$\psi_x(i, j) = \left(\frac{\partial I^{(1)}}{\partial x}(i, j) + \frac{\partial I^{(0)}}{\partial x}(i, j)\right) \gg n_a \quad \text{(Eq. 12)}$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

where $\Omega$ is a 6×6 window around the 4×4 sub-block, and the values of $n_a$ and $n_b$ are set equal to min(5, bitDepth−7) and min(8, bitDepth−4), respectively.

The motion refinement $(v_x, v_y)$ is then derived using the cross- and auto-correlation terms as follows:

$$v_x = S_1 > 0?\text{clip3}(-th'_{BIO}, th'_{BIO}, -((S_3 \cdot 2^{n_b-n_a}) \gg \lfloor \log_2 S_1 \rfloor)):0 \quad \text{(Eq. 13)}$$

$$v_y = S_5 > 0?\text{clip3}(-th'_{BIO}, th'_{BIO}, -((S_6 \cdot 2^{n_b-n_a} - ((v_x S_{2,m}) \ll n_{s_2} + v_x S_{2,s})/2) \gg \lfloor \log_2 S_5 \rfloor)):0$$

where $$S_{2,m} = S_2 \gg n_{S_2}, S_{2,s} = S_2 \& (2^{n_{S_2}} - 1), th'_{BIO} = 2^{13-BD},$$

$\lfloor \cdot \rfloor$ is the floor function, and $n_{s_2}=12$.

Based on the motion refinement and the gradients, the following adjustment is calculated for each sample in the 4×4 sub-block:

$$b(x, y) = rnd\left(\left(v_x\left(\frac{\partial I^{(1)}(x, y)}{\partial x} - \frac{\partial I^{(0)}(x, y)}{\partial x}\right)\right)/2\right) + \quad \text{(Eq. 14)}$$

$$rnd\left(\left(v_y\left(\frac{\partial I^{(1)}(x, y)}{\partial y} - \frac{\partial I^{(0)}(x, y)}{\partial y}\right)\right)/2\right)$$

Step 3: The BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{offset}) \gg shift \quad \text{(Eq. 15)}$$

These values are selected such that the multipliers in the BDOF process do not exceed 15-bits, and the maximum bit-width of the intermediate parameters in the BDOF process is kept within 32-bits.

Figure 18:
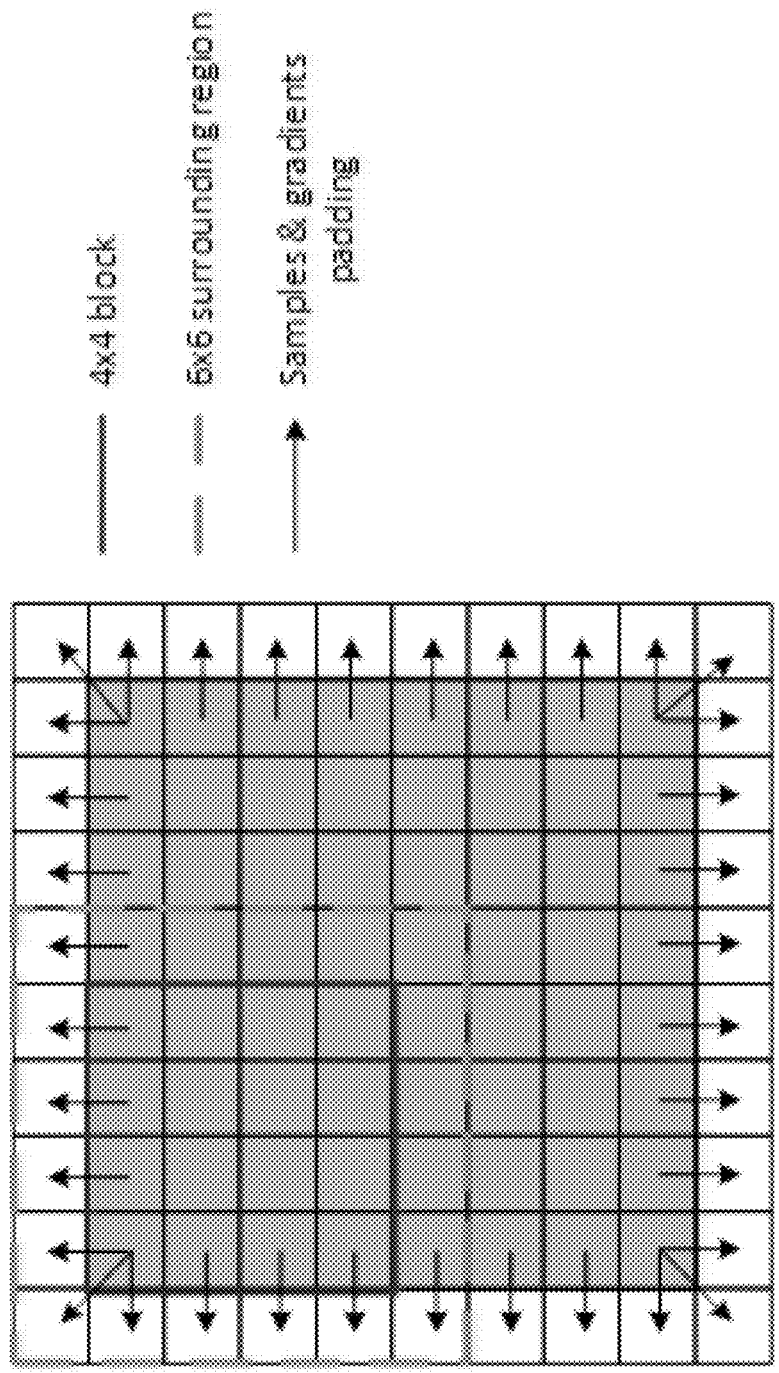
FIG. 18 shows an example of an extended CU region using bi-directional optical flow (BDOF).

According to some embodiments, in order to derive the gradient values, some prediction samples $I^{(k)}(i,j)$ in list k (k=0,1) outside of the current CU boundaries need to be generated. As depicted in FIG. 18, the BDOF in VTM4 uses one extended row/column around the CU's boundaries. In order to control the computational complexity of generating the out-of-boundary prediction samples, prediction samples in the extended area (white positions) may be generated by taking the reference samples at the nearby integer positions (e.g., using floor( ) operation on the coordinates) directly without interpolation, and the normal 8-tap motion compensation interpolation filter may be used to generate prediction samples within the CU (gray positions). In some examples, these extended sample values are used only in the gradient calculation. For the remaining steps in the BDOF process, if any sample and gradient values outside of the CU boundaries are needed, they are padded (i.e., repeated) from their nearest neighbors.

The current sub-block affine motion compensation and refinement processes have some disadvantages. First, the 4×4 level sub-block affine prediction, (2,2) position of each sub-block is used as the center to derive a MV of the sub-block, which is not accurate. Second, in PROF, the calculation of ΔI(i,j) with (Eq. 5) needs 16-bit multiplication, which leads to high computational complexity. Third, when calculating a gradient based prediction, padding is used at a sub-block boundary, which is not necessary. Embodiments of the present disclosure provide solutions to these disadvantages.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit (i.e., CU).

According to some embodiments, for W×H sub-blocks, the true sub-block center position, position $$\left(\frac{W-1}{2}, \frac{H-1}{2}\right),$$

is used to derive a MV of each sub-block (assuming the top-left corner of each sub-block is (0, 0)). When further using PROF, the MV differences (i.e., $\Delta v_x(x, y)$ and $\Delta v_y(x, y)$ in (Eq. 5)) are also calculated for each pixel sample relative to the MV of position $$\left(\frac{W-1}{2}, \frac{H-1}{2}\right).$$

In one example, when W=4 and H=4, the (3/2,3/2) position is used to derive the MV of each sub-block. During this calculation, additional rounding may be introduced due to the resulting fractional MV. In some embodiments, the rounding may be toward zero. Alternatively, the rounding may be toward positive infinity, or negative infinity, or away from zero.

According to some embodiments, a bit-depth of the gradients and the MV differences in (Eq. 5) is restricted so that the range of results of multiplications in (Eq. 5) are within certain bits. For example, the bit-depth of the gradients and the MV differences may be restricted to within a 16-bit range. In some embodiments, the range of gradient values is kept within 11-bits (including sign), and the range of MV differences is kept within 5-bits or 4-bits (including sign) by range clipping. As an example, if a gradient or MV difference has more bits than allowed, they are first clipped to the allowed range.

In some embodiments, the gradients are kept within min(11, Dep+1) bits, where Dep represents the bit-depth of input video signal. When Dep≥10, gradient values may be right shifted by (Dep−10) after the gradient calculations in (Eq. 3) and (Eq. 4) such that the range of final gradient values fed into (Eq. 5) are kept within 11 bits. In some embodiments, the precision of MV differences is one bit higher than the MV precision which is used in motion compensated interpolation. In some embodiments, the precision of a gradient is kept the same as interpolated pixels at fractional sample positions.

According to some embodiments, for W×H sub-blocks, a block size M×N is defined, where M is a multiple of W and M>W, and N is a multiple of H and N>H. The gradients used in (Eq. 5) may be calculated at the level of M×N blocks, instead of W×H sub-blocks. When M×N is used instead of W×H, the padding process mentioned for PROF may be applied at the boundaries of M×N blocks instead of the boundaries of W×H sub-blocks. In some examples, when W=4 and H=4, M and N may be fixed to 8 or 16. In some embodiments, M and N may be signaled in bitstreams, such as in sequence parameter set (SPS), picture parameter set (PPS), slice header, or tile group header.

According to some embodiments, BDOF and PROF may share the same process of calculating the gradient values. In some embodiments, the same process includes using the same W, H, M, and N in the same way for BDOF and PROF. In some embodiments, the same process includes using the same filter kernel to calculate gradients in BDOF and PROF.

Figure 19:
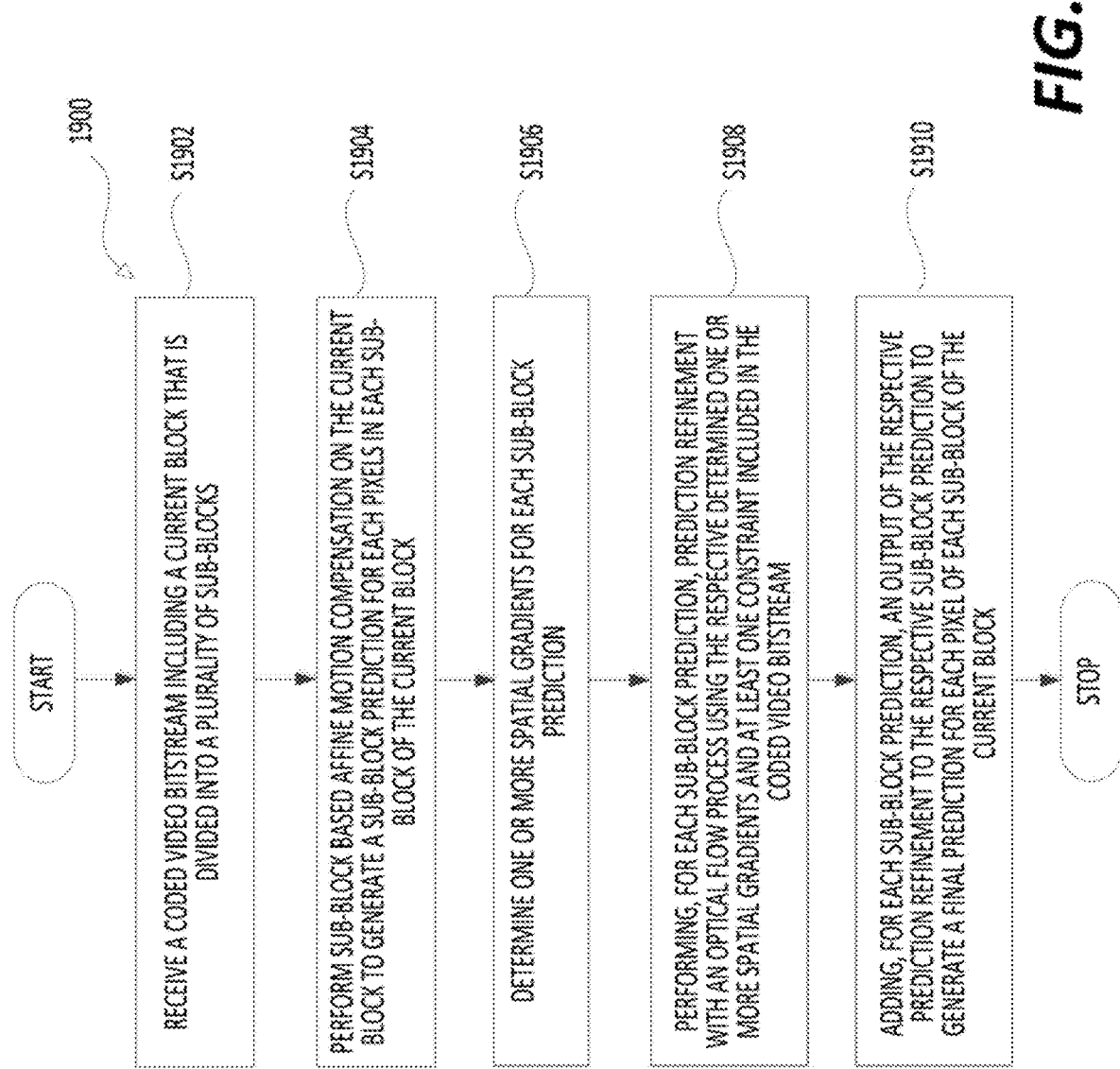
FIG. 19 shows a flow chart outlining a process example according to some embodiments of the disclosure.

FIG. 19 shows a flow chart outlining a process (1900) according to an embodiment of the disclosure. In various embodiments, the process (1900) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1900) is implemented in software instructions. Therefore, when the processing circuitry executes the software instructions, the processing circuitry performs the process (1900). The process starts at (S1902) and proceeds to (S1910).

The process may start at step (S1902) where a coded video bitstream including a current block that is divided into a plurality of sub-blocks is received. The process proceeds to step (S1904) where sub-block based affine motion compensation is performed on the current block to generate a sub-block prediction for each pixel in each sub-block of the current block.

The process proceeds to step (S1906) where one or more spatial gradients for each sub-block prediction. For example, (Eq. 3) and (Eq. 4) are performed for each sub-block prediction generated in step (S1904). The process proceeds from step (S1906) to step (S1908) where for each sub-block prediction, prediction refinement is performed with an optical flow process using the respective determined one or more spatial gradients and at least one constraint included in the coded video bitstream. For example, the PROF or BDOF process may be used using the spatial gradients generated in step (S1906). The at least one constraint may specify the permitted number of bits for the spatial gradient or an MV difference.

The process proceeds from step (S1908) to (S1910) where for each sub-block prediction, an output of the respective prediction refinement is added to the respective sub-block prediction to generate a final prediction for each pixel of each sub-block of the current block. Process (1900) terminates after step (S1910) is completed.

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
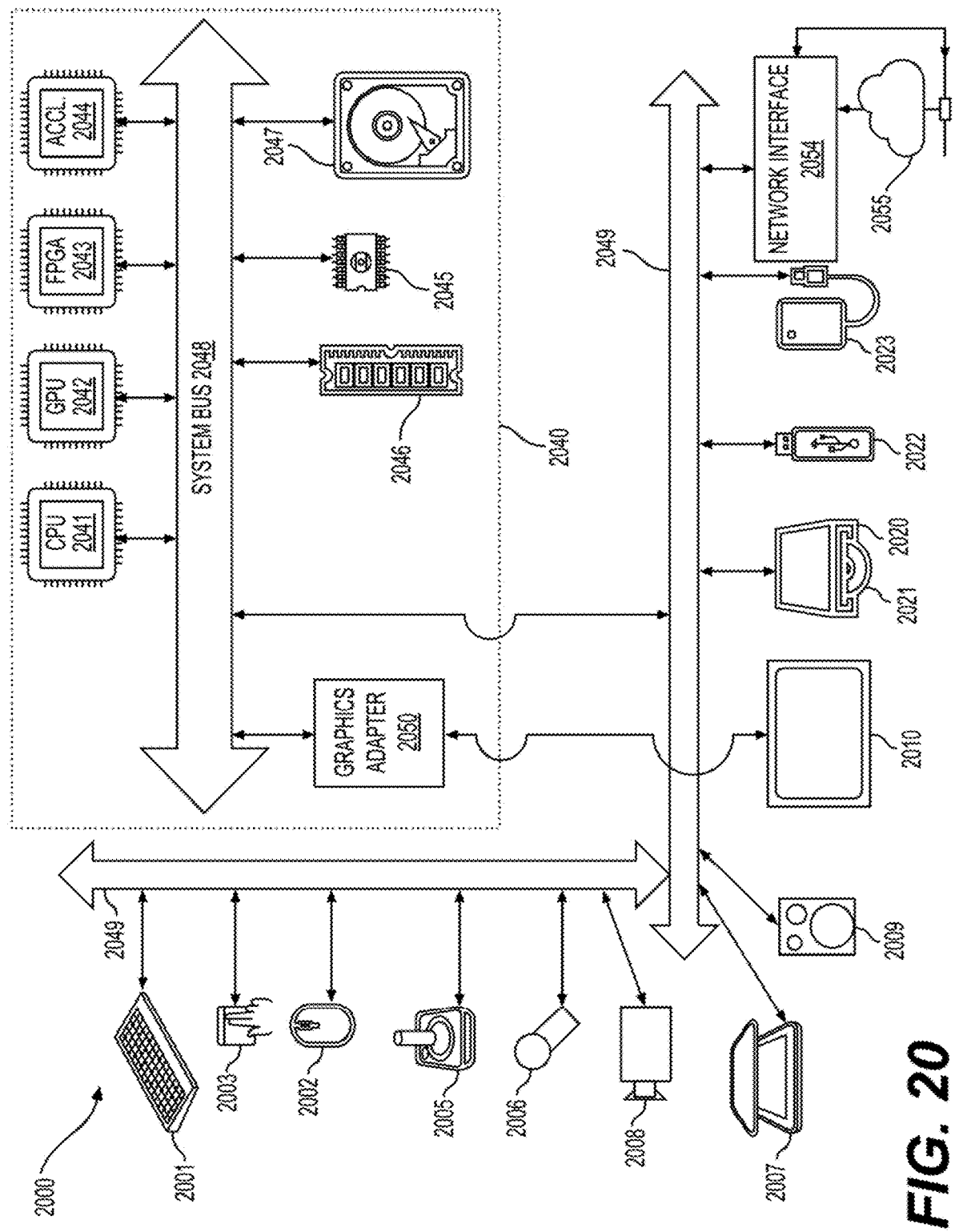
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding performed in a video decoder, the method including receiving a coded video bitstream including a current block that is divided into a plurality of sub-blocks; performing sub-block based affine motion compensation on the current block to generate a sub-block prediction for each pixel in each sub-block of the current block; determining one or more spatial gradients for each sub-block prediction; performing, for each sub-block prediction, prediction refinement with an optical flow process using the respective determined one or more spatial gradients and at least one constraint included in the coded video bitstream; and adding, for each sub-block prediction, an output of the respective prediction refinement to the respective sub-block prediction to generate a final prediction for each pixel in each sub-block of the current block.

(2) The method of feature (1), in which the at least one constraint restricts a bit-depth of the (i) the one or more spatial gradients and/or (ii) a motion vector (MV) difference generated by the optical flow process.

(3) The method of feature (2), in which the at least one constraint restricts the one or more spatial gradients to a number of bits that is less than or equal to K, and the at least one constraint restricts the MV difference to a number of bits that is less than or equal to N.

(4) The method of feature (3), in which the sum of K and N is less than or equal to 16.

(5) The method of feature (3), in which K is equal to a min (11, Dep+1) bits, in which Dep represents a bit-depth of an input video signal.

(6) The method of feature (5), in which in response to a determination that Dep is greater than or equal to 10, the one or more gradient values are right shifted by (Dep−10).

(7) The method of any one of features (2)-(6), in which the at least one constraint specifies that a precision of the MV difference is one bit higher than a precision of a MV precision used in motion compensated interpolation.

(8) The method of any one of features (2)-(6), in which the at least one constraint specifies that a precision of the gradient is kept the same as interpolated pixels at fractional sample positions.

(9) The method of any one of features (1)-(8), in which the determination of the gradients and performance of the prediction refinement for the current block are performed in accordance with a prediction refinement with optical flow (PROF) process, in which another block in a same current picture as the current block is decoded in accordance with a bi-directional optical flow (BDOF) process, and in which the at least one constraint specifies that the PROF process for the current block and the BDOF process for the another block share a same process for determining one or more spatial gradient values for the current block and the another block.

(10) The method of feature (9), in which the PROF process for the current block and the BDOF process for the another block use a same height and weight to determine the one or more spatial gradient values for the current block and the another block.

(11) The method of feature (9), in which the PROF process for the current block and the BDOF process for the another block use a same filter kernel to determine the one or more spatial gradient values for the current block and the another block.

(12) The method of any one of features (1)-(12), in which each sub-block has a width W and a height H, and in which a sub-block center position of each sub-block is ((W−1)/2, (H−1)/2) to derive each MV of each sub-block.

(13) The method of feature (12), in which a motion vector (MV) difference generated by the optical flow process is calculated for each pixel sample relative to the MV of position ((W−1)/2, (H−1)/2).

(14) The method of feature (12), in which in response to a determination that a MV derived using the position ((W−1)/2, (H−1)/2) is a fractional MV, the fractional MV is rounded to a nearest integer.

(15) The method of feature (14), in which the fractional MV is rounded to a nearest integer towards infinity.

(16) The method of any one of features (1)-(15), in which each sub-block has a width W and a height H, and in which the block size used for the prediction refinement is M×N, in which M is a multiple of W and M>W, and in which N is a multiple of H, and N is greater than H.

(17) The method of feature (16), in which a padding process is applied at the boundaries of each M×N block.

(18) The method of feature (17), in which M and N are included in the coded video bitstream.

(19) A video decoder for video decoding includes processing circuitry configured to receive a coded video bitstream including a current block that is divided into a plurality of sub-blocks, perform sub-block based affine motion compensation on the current block to generate a sub-block prediction for each pixel in each sub-block of the current block, determine one or more spatial gradients for each sub-block prediction, perform, for each sub-block prediction, prediction refinement with an optical flow process using the respective determined one or more spatial gradients and at least one constraint included in the coded video bitstream, and add, for each sub-block prediction, an output of the respective prediction refinement to the respective sub-block prediction to generate a final prediction for each pixel in each sub-block of the current block.

(20) A non-transitory computer readable medium having instructions stored therein, which when executed by a processor in a video decoder causes the processor to perform a method includes receiving a coded video bitstream including a current block that is divided into a plurality of sub-blocks; performing sub-block based affine motion compensation on the current block to generate a sub-block prediction for each pixel in each sub-block of the current block; determining one or more spatial gradients for each sub-block prediction; performing, for each sub-block prediction, prediction refinement with an optical flow process using the respective determined one or more spatial gradients and at least one constraint included in the coded video bitstream; and adding, for each sub-block prediction, an output of the respective prediction refinement to the respective sub-block prediction to generate a final prediction for each pixel in each sub-block of the current block.

What is claimed is:

1. A method of video decoding performed in a video decoder, the method comprising:
performing sub-block based affine motion compensation on the current block to generate a sub-block prediction for each pixel in each sub-block of the current block;
determining one or more spatial gradients for each sub-block prediction;
performing, for each sub-block prediction, prediction refinement with optical flow process using the respective determined one or more spatial gradients, a motion vector (MV) difference of a MV of the pixel corresponding to the respective sub-block prediction, and bit-depth constraints of a bitstream; and
adding, for each sub-block prediction, an output of the respective prediction refinement to a respective sub-block prediction to generate a final prediction for each pixel in each sub-block of the current block,
wherein the bit-depth constraints restrict the one or more spatial gradients to a number of bits that is less than or equal to K and the MV difference to a number of bits that is less than or equal to M in the prediction refinement with the optical flow process in which the restricted one or more spatial gradients of the respective sub-block prediction are multiplied by the MV difference of the MV of the pixel corresponding to the respective sub-block prediction, and
wherein K and M are integers.

2. The method of claim 1, wherein a sum of K and N is less than or equal to 16.

3. The method of claim 1, wherein K is equal to a min (11, Dep+1) bits, wherein Dep represents a bit-depth of an input video signal.

4. The method of claim 3, wherein when Dep is greater than or equal to 10, the one or more spatial gradients are right shifted by (Dep−10).

5. The method of claim 1, wherein the bid-depth constraints further specify that a precision of the MV difference is one bit higher than a precision of a MV precision used in motion compensated interpolation.

6. The method of claim 1, wherein the bit-depth constraints further specify that a precision of the one or more spatial gradients is kept the same as interpolated pixels at fractional sample positions.

7. The method of claim 1, wherein the determination of the one or more spatial gradients and performance of the predication refinement for the current block are performed in accordance with a prediction refinement with optical flow (PROF) process, wherein another block in a same current picture as the current block is decoded in accordance with a bi-directional optical flow (BDOF) process, and wherein the bit-depth constraints further specify that the PROF process for the current block and the BDOF process for the another block share a same process for determining one or more spatial gradient values for the current block and the another block.

8. The method of claim 1, wherein each sub-block has a width W and a height H, and wherein a sub-block center position of each sub-block is ((W−1)/2, (H−1)/2) to derive each MV of each sub-block.

9. The method of claim 1, wherein each sub-block has a width W and a height H, and wherein a block size used for the prediction refinement is M×N, wherein M is a multiple of W and M>W, and wherein N is a multiple of H, and N is greater than H.

10. The method of claim 9, wherein a padding process is applied at boundaries of each M×N block.

11. A method of processing visual media data, the method comprising:

processing a bitstream that includes the visual media data according to a format rule, wherein the bitstream includes coded information of a current block that is divided into a plurality of sub-blocks; and the format rule specifies that sub-block based affine motion compensation is performed on the current block to generate a sub-block prediction for each pixel in each sub-block of the current block, one or more spatial gradients for each sub-block prediction are determined, prediction refinement is performed, for each sub-block prediction, with an optical flow process using a respective determined one or more spatial gradients, a motion vector (MV) difference of a MV of the pixel corresponding to the respective sub-block prediction, and bit-depth constraints included in the bitstream, for each sub-block prediction, an output of a respective prediction refinement is added to a respective sub-block prediction to generate a final prediction for each pixel in each sub-block of the current block, the bit-depth constraints restrict the one or more spatial gradients to a number of bits that is less than or equal to K and the MV difference to a number of bits that is less than or equal to M in the prediction refinement with the optical flow process in which the restricted one or more spatial gradients of the respective sub-block prediction are multiplied by the MV difference of the MV of the pixel corresponding to the respective sub-block prediction, and K and M are integers.

12. The method of claim 11, wherein a sum of K and N is less than or equal to 16.

13. The method of claim 11, wherein K is equal to a min (11, Dep+1) bits, wherein Dep represents a bit-depth of an input video signal.

14. The method of claim 13, wherein when Dep is greater that or equal to 10, the one or more spatial gradients are right shifted by (Dep−10).

15. The method of claim 11, wherein the bit-depth constraints further specify that a precision of the MV difference is one bit higher than a precision of a MV precision used in motion compensated interpolation.

16. The method of claim 11, wherein the bit-depth constraints further specify that a precision of the one or more spatial gradients is kept the same as interpolated pixels at fractional sample positions.

17. The method of claim 11, wherein the determination of the one or more spatial gradients and performance of the prediction refinement for the current block are performed in accordance with a prediction refinement with optical flow (PROF) process, wherein another block in a same current picture as the current block is decoded in accordance with a bi-directional optical flow (BDOF) process, and wherein the bit-depth constraints further specify that the PROF process for the current block and the BDOF process for the another block share a same process for determining one or more spatial gradient values for the current block and the another block.

18. The method of claim 11, wherein each sub-block has a width W and a height H, and wherein a sub-block center position of each sub-block is ((W−1)/2, (H−1)/2) to derive each MV of each sub-block.

19. The method of claim 11, wherein each sub-block has a width W and a height H, and wherein a block size used for prediction refinement is M×N, wherein M is a multiple of W and M>W, and wherein N is a multiple of H, and N is greater that H.

20. The method of claim 19, wherein a padding process is applied at boundaries of each M×N block.

* * * * *